(12) United States Patent
Chen et al.

(10) Patent No.: US 9,669,657 B2
(45) Date of Patent: Jun. 6, 2017

(54) BIDIRECTIONAL HUB ASSEMBLY

(71) Applicant: Kun Teng Industry Co., Ltd., Taichung (TW)

(72) Inventors: Hubert Chen, Taichung (TW); Yung-Yuan Liao, Taichung (TW)

(73) Assignee: Kun Teng Industry Co., Ltd., Taichung (TW)

( * ) Notice: Subject to any disclaimer, the term of this patent is extended or adjusted under 35 U.S.C. 154(b) by 0 days.

(21) Appl. No.: 14/933,596

(22) Filed: Nov. 5, 2015

(65) Prior Publication Data
US 2016/0327102 A1 Nov. 10, 2016

(30) Foreign Application Priority Data
May 7, 2015 (TW) .............................. 104114594 A

(51) Int. Cl.
*B60B 27/04* (2006.01)
*F16D 41/26* (2006.01)
*F16D 41/30* (2006.01)
*F16D 41/16* (2006.01)

(52) U.S. Cl.
CPC ............ *B60B 27/047* (2013.01); *F16D 41/16* (2013.01); *F16D 41/26* (2013.01); *F16D 41/30* (2013.01)

(58) Field of Classification Search
CPC ....... B60B 27/047; F16D 41/12; F16D 41/16; F16D 41/30
See application file for complete search history.

(56) References Cited

U.S. PATENT DOCUMENTS

| | | | | |
|---|---|---|---|---|
| 1,590,129 | A * | 6/1926 | Stratford | F16D 41/16 74/650 |
| 1,767,593 | A * | 6/1930 | Laabs | F16D 41/12 192/42 |
| 4,766,772 | A * | 8/1988 | Tsuchie | B62K 5/003 192/48.92 |
| 7,121,394 | B2 * | 10/2006 | Chen | F16D 41/30 192/46 |
| 7,484,609 | B2 * | 2/2009 | Chen | B60B 27/0073 192/64 |
| 9,061,546 | B2 * | 6/2015 | Chen | B60B 27/047 |
| 2004/0238306 | A1 * | 12/2004 | Reed | F16D 41/16 192/43.1 |
| 2010/0044180 | A1 * | 2/2010 | Chen | F16D 41/30 192/64 |

* cited by examiner

*Primary Examiner* — Kip T Kotter
(74) *Attorney, Agent, or Firm* — Trop Pruner & Hu, P.C.

(57) ABSTRACT

A bidirectional hub assembly includes an axle unit, a hub shell mounted on the axle unit, a driving unit mounted on the axle unit, and a plurality of right-hand-drive and left-hand-drive units that are mounted to the hub shell. Each of the right-hand-drive and left-hand-drive units has a pawl engageable with the driving unit. The bidirectional hub assembly serves as a right-hand-drive hub when the pawl of at least one of the right-hand-drive units is in an enabled state and the pawl of each of the left-hand-drive units is in a disabled state, and serves as a left-hand-drive hub when the pawl of at least one of the left-hand-drive units is in an enabled state and the pawl of each of the right-hand-drive units is in a disabled state.

6 Claims, 9 Drawing Sheets

BIDIRECTIONAL HUB ASSEMBLY

CROSS-REFERENCE TO RELATED APPLICATION

This application claims priority of Taiwanese Application No. 104114594, filed on May 7, 2015.

FIELD

The disclosure relates to a hub assembly, and more particularly to a bidirectional hub assembly.

BACKGROUND

Referring to FIGS. 1 to 4, a conventional hub assembly 10 includes an axle unit 11, a hub shell 12, a driving member 13, a pawl unit 14 and a resilient unit 15.

The axle unit 11 includes an axle member 111, and a plurality of bearings 112 that are mounted on the axle member 111.

The hub shell 12 is mounted on two of the bearings 112 of the axle unit 11, is rotatable about the axle member 111, and has s a surrounding wall 122 and a plurality of installation grooves 124. The surrounding wall 122 defines an inner space 121 therein. The installation grooves 124 are formed in an inner surrounding surface of an end section of the surrounding wall 122. Each of the installation grooves 124 is defined by a respective one of groove-defining surfaces of the surrounding wall 122, and has an opening 123 that communicates spatially with the inner space 121. Each of the groove-defining surfaces has a bottom surface portion 125 that faces the opening 123 of the corresponding one of the installation grooves 124, and a first arc surface portion that is connected to one end of the bottom surface portion 125 in the circumferential direction of the surrounding wall 122 and that defines a first mounting groove portion 126 of the corresponding one of the installation grooves 124, and a second arc surface portion that is connected to an end of the bottom surface portion 125 distal from the first arc surface portion and that defines a second mounting groove portion 127 of the corresponding one of the installation grooves 124.

The driving member 13 is mounted on the bearings 112 of the axle unit 11, is rotatable about the axle member 111, and has a ratchet ring section 131 that extends into the end section of the surrounding wall 122 and that has a plurality of outer teeth 133, and a sprocket section 132 that is disposed out of the hub shell 12. Each of the outer teeth 133 has first and second side surfaces 134, 135 that are opposite to each other in the circumferential direction of the ratchet ring section 131.

The pawl unit 14 includes a plurality of pawls 141 each of which has s a mounting portion 142 and a claw portion 143.

The resilient unit 15 includes a plurality of resilient members 151. Each of the resilient members 151 has a mounting section 152, a positioning section 153 extending from an end of the mounting section 152 for abutting against the bottom surface portion 125 of a respective one of the groove-defining surfaces of the surrounding wall 122, and an urging section 154 extending from another end of the mounting section 152 distal from the positioning section 153 for abutting against a respective one of the pawls 141.

When the mounting portion 142 of each of the pawls 141 is mounted in the first mounting groove portion 126 of a respective one of the installation grooves 124 and when the mounting section 152 of each of the resilient members 151 is mounted in the second mounting groove portion 127 of a respective one of the installation grooves 124 (see FIGS. 1 and 2), the conventional hub assembly 10 serves as a right-hand-drive hub (i.e., the sprocket section 132 of the driving member 13 is located at the right hand side of a bicycle). When the mounting portion 142 of each of the pawls 141 is mounted in the second mounting groove portion 127 of a respective one of the installation grooves 124 and when the mounting section 152 of each of the resilient members 151 is mounted in the first mounting groove portion 126 of a respective one of the installation grooves 124 (see FIGS. 3 and 4), the conventional hub assembly 10 serves as a left-hand-drive hub (i.e., the sprocket section 132 of the driving member 13 is located at the left hand side of a bicycle).

However, in the switching operation of the conventional hub assembly 10 between the right-hand-drive use and the left-hand-drive use, all the pawls 141 and the resilient members 151 need to be uninstalled and reinstalled, resulting in a laborious operation.

U.S. Pat. No. 4,766,772 discloses another conventional hub assembly that is capable of serving as a right-hand-drive hub or a left-hand-drive hub without disassembling of components thereof. However, the conventional hub assembly of U.S. Pat. No. 4,766,772 has redundant transmission mechanisms.

SUMMARY

Therefore, an object of the disclosure is to provide a bidirectional hub assembly that can overcome at least one of the aforesaid drawbacks associated with the prior arts.

According to the disclosure, the bidirectional hub assembly includes an axle unit, a hub shell, a driving unit, a plurality of right-hand-drive units and a plurality of left-hand-drive units. The axle unit extends along an axis. The hub shell is mounted on the axle unit, is rotatable about the axis, and has a surrounding wall, a plurality of right-hand-drive installation grooves and a plurality of left-hand-drive installation grooves. The surrounding wall defines an inner space therein. The right-hand-drive and left-hand-drive installation grooves are formed in an inner surrounding surface of an end section of the surrounding wall. Each of the right-hand-drive installation grooves is defined by a respective one of first groove-defining surfaces of the surrounding wall, and has an opening that communicates spatially with the inner space. Each of the first groove-defining surfaces has a bottom surface portion that faces the opening of the corresponding one of the right-hand-drive installation grooves, and a first arc surface portion that is connected to one end of the bottom surface portion in the circumferential direction of the surrounding wall and that defines a first mounting groove portion of the corresponding one of the right-hand-drive installation grooves. Each of the left-hand-drive installation grooves is defined by a respective one of second groove-defining surfaces of the surrounding wall, and has an opening that communicates spatially with the inner space. Each of the second groove-defining surfaces has a bottom surface portion that faces the opening of the corresponding one of the left-hand-drive installation grooves, and a first arc surface portion that is connected to one end of the bottom surface portion in the circumferential direction of the surrounding wall and that defines a first mounting groove portion of the corresponding one of the left-hand-drive installation grooves. The driving unit is mounted on the axle unit, is rotatable about the axis, and has a ratchet ring section that extends into the end section of the surrounding wall and that has a plurality of outer teeth. Each of the outer teeth has s first and second side surfaces that are opposite to each other in the circumferential direction of the ratchet ring section. Each of the right-hand-drive units includes a right-hand-drive pawl that has a mounting portion mounted pivotally in the first mounting groove portion of a respective one of the right-hand-drive installation grooves, a claw portion extending from the mounting portion into the opening of the respective one of the right-hand-drive installation grooves, and a driven portion, a right-hand-drive resilient member that is mounted in the respective one of the right-hand-drive installation grooves for biasing resiliently the claw portion of the right-hand-drive pawl toward the ratchet ring section, and a right-hand-drive switching member that is mounted movably in the hub shell, and that has an operation portion extending out of the surrounding wall, and a driving portion in contact with the driven portion of the right-hand-drive pawl. The right-hand-drive pawl of each of the right-hand-drive units is operable to switch between an enabled state where the right-hand-drive resilient member urges the right-hand-drive pawl to bias resiliently the claw portion to contact the ratchet ring section such that the claw portion is engageable with the first side surface of one of the outer teeth, and a disabled state where the right-hand-drive switching member pushes the driven portion of the right-hand-drive pawl to separate the claw portion from any one of the first side surfaces of the outer teeth of the ratchet ring section against the biasing action of the right-hand-drive resilient member. Each of the left-hand-drive units includes a left-hand-drive pawl that has a mounting portion mounted pivotally in the first mounting groove portion of a respective one of the left-hand-drive installation grooves, a claw portion extending from the mounting portion into the opening of the respective one of the left-hand-drive installation grooves, and a driven portion, a left-hand-drive resilient member that is mounted in the respective one of the left-hand-drive installation grooves for biasing resiliently the claw portion of the left-hand-drive pawl toward the ratchet ring section, and a left-hand-drive switching member that is mounted movably in the hub shell, and that has an operation portion extending out of the surrounding wall, and a driving portion in contact with the driven portion of the left-hand-drive pawl. The left-hand-drive pawl of each of the left-hand-drive units is operable to switch between an enabled state where the left-hand-drive resilient member urges the left-hand-drive pawl to bias resiliently the claw portion to contact the ratchet ring section such that the claw portion is engageable with the second side surface of one of the outer teeth, and a disabled state where the left-hand-drive switching member pushes the driven portion of the left-hand-drive pawl to separate the claw portion from any one of the second side surfaces of the outer teeth of the ratchet ring section against the biasing action of the left-hand-drive resilient member. When the right-hand-drive pawl of at least one of the right-hand-drive units is in the enabled state and the left-hand-drive pawl of each of the left-hand-drive units is in the disabled state, the bidirectional hub assembly serves as a right-hand-drive hub. When the right-hand-drive pawl of each of the right-hand-drive units is in the disabled state and the left-hand-drive pawl of at least one of the left-hand-drive units is in the enabled state, the bidirectional hub assembly serves as a left-hand-drive hub.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 5:
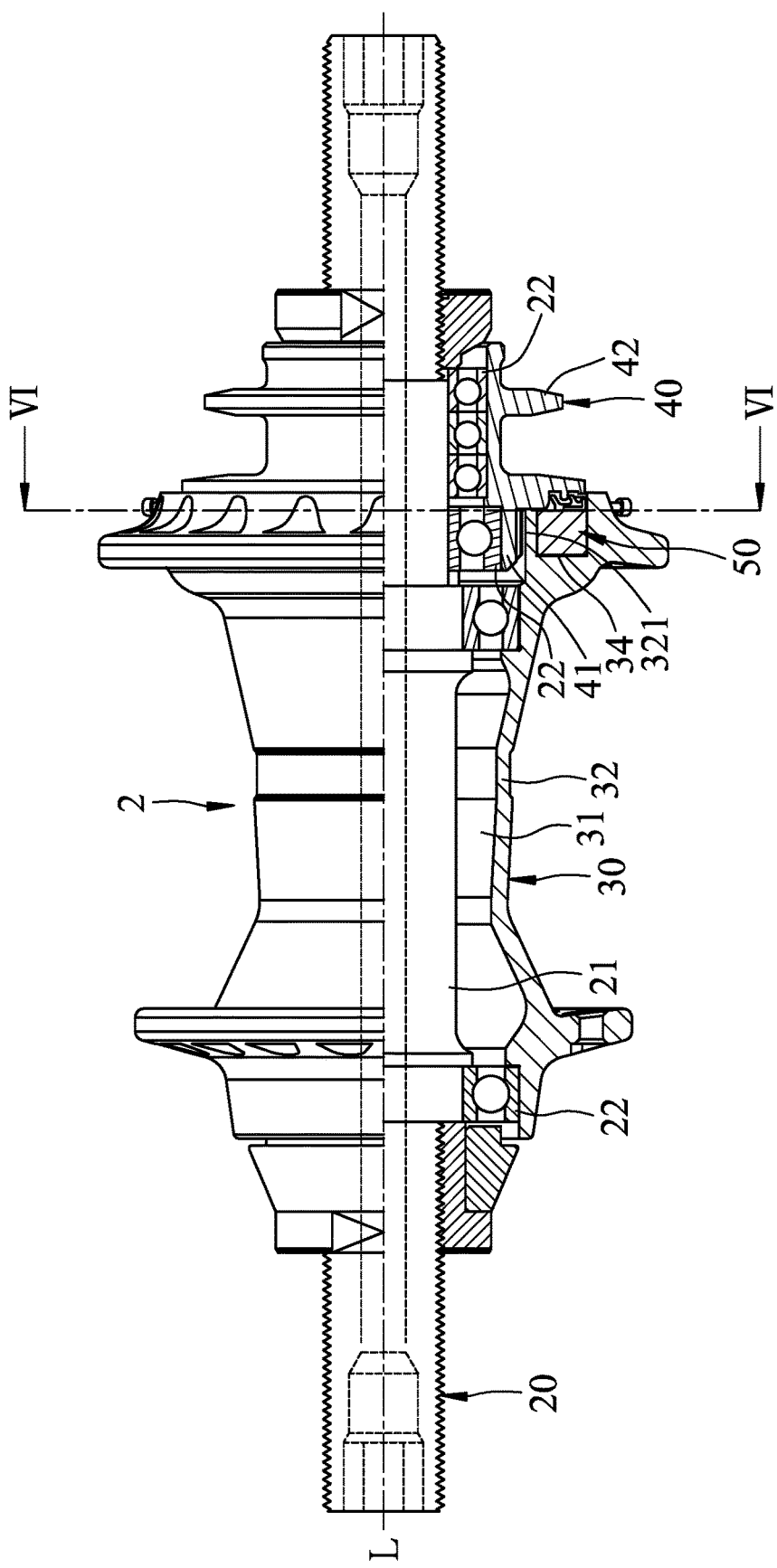
FIG. 5 is a partly sectional view of an embodiment of a bidirectional hub assembly according to the disclosure.
Figure 6:
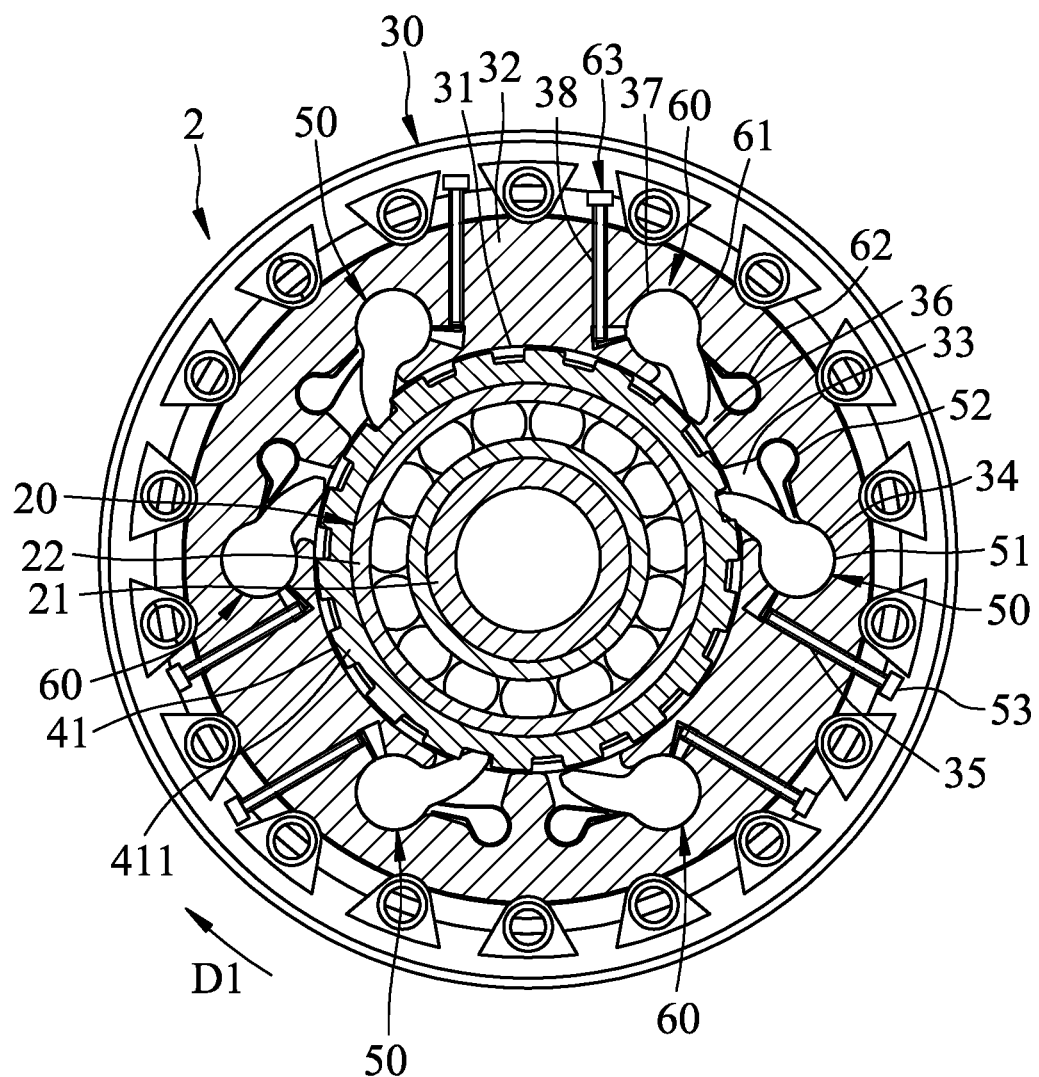
FIG. 6 is a sectional view of the embodiment taken along line VI-VI in FIG. 5, illustrating the embodiment serving as a right-hand-drive hub.
Figure 9:
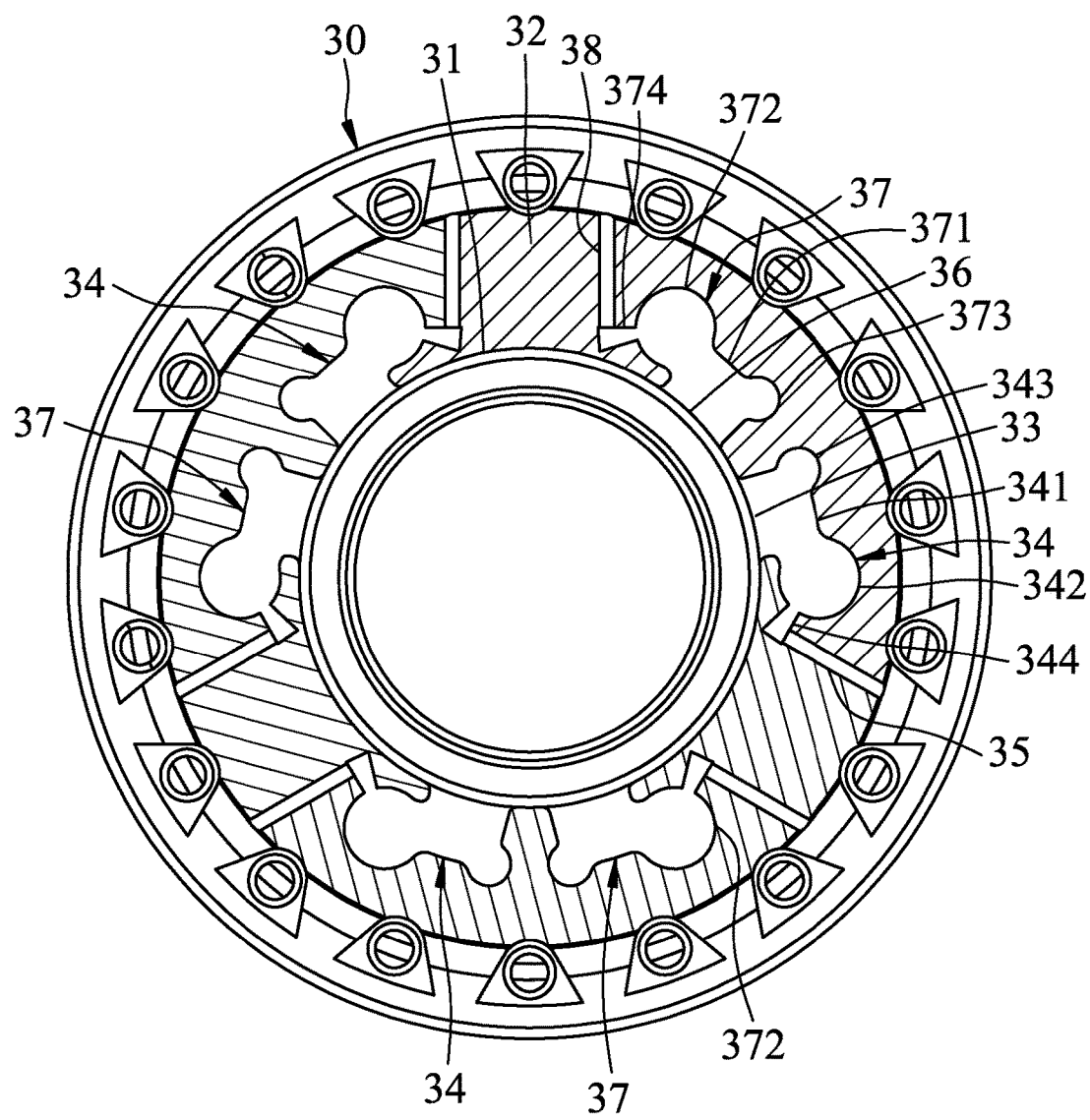
FIG. 9 is a sectional view of a hub shell of the embodiment.

Referring to FIGS. 5, 6 and 9, an embodiment of the bidirectional hub assembly 2 according to the disclosure includes an axle unit 20, a hub shell 30, a driving unit 40, a plurality of right-hand-drive units 50 and a plurality of left-hand-drive units 60.

The axle unit 20 includes an axle member 21 that extends along an axis (L), and a plurality of bearings 22 that are mounted on the axle member 21.

The hub shell 30 is mounted on the bearings 22 of the axle unit 20, is rotatable about the axis (L), and has a surrounding wall 32, a plurality of right-hand-drive installation grooves 34, a plurality of right-hand-drive through holes 35, a plurality of left-hand-drive installation grooves 37 and a plurality of left-hand-drive through holes 38. The surrounding wall 32 surrounds the axis (L), and defines an inner space 31 therein. The right-hand-drive and left-hand-drive installation grooves 34, 37 are formed in an inner surrounding surface 321 of an end section of the surrounding wall 32. In this embodiment, the hub shell 30 has three right-hand-drive installation grooves 34, three right-hand-drive through holes 35, three left-hand-drive installation grooves 37 and three left-hand-drive through holes 38.

The right-hand-drive installation grooves 34 are defined respectively by first groove-defining surfaces of the surrounding wall 32. Each of the right-hand-drive installation grooves 34 has an opening 33 that communicates spatially with the inner space 31. Each of the first groove-defining surfaces has a bottom surface portion 341 that faces the opening 33 of the corresponding one of the right-hand-drive installation grooves 34, a first arc surface portion that is connected to one end of the bottom surface portion 341 in the circumferential direction of the surrounding wall 32 and that defines a first mounting groove portion 342 of the corresponding one of the right-hand-drive installation grooves 34, and a second arc surface portion that is connected to an end of the bottom surface portion 341 distal from the first arc surface portion and that defines a second mounting groove portion 343 of the corresponding one of the right-hand-drive installation grooves 34. Each of the right-hand-drive installation grooves 34 further has a limiting groove portion 344 that is formed in the first arc surface portion of the corresponding one of the first groove-defining surfaces and that communicates spatially with the first mounting groove portion 342 of the corresponding right-hand-drive installation groove 34.

Each of the right-hand-drive through holes 35 is formed in an outer surface of the hub shell 30 and communicates spatially with the limiting groove portion 344 of a respective one of the right-hand-drive installation grooves 34.

The left-hand-drive installation grooves 37 are defined respectively by second groove-defining surfaces of the surrounding wall 32. Each of the left-hand-drive installation grooves 37 has an opening 36 that communicates spatially with the inner space 31. Each of the second groove-defining surfaces has a bottom surface portion 371 that faces the opening 36 of the corresponding one of the left-hand-drive installation grooves 37, a first arc surface portion that is connected to one end of the bottom surface portion 371 in the circumferential direction of the surrounding wall and that defines a first mounting groove portion 372 of the corresponding one of the left-hand-drive installation grooves 37, and a second arc surface portion that is connected to an end of the bottom surface portion 371 distal from the first arc surface portion and that defines a second mounting groove portion 373 of the corresponding one of the left-hand-drive installation grooves 37. Each of the left-hand-drive installation grooves 37 further has a limiting groove portion 374 that is formed in the first arc surface portion of the corresponding one of the second groove-defining surfaces 37 and that communicates spatially with the first mounting groove portion 372 of the corresponding left-hand-drive installation groove 37.

Each of the left-hand-drive through holes 38 is formed in the outer surface of the hub shell 30 and communicates spatially with the limiting groove portion 374 of a respective one of the left-hand-drive installation grooves 37.

In this embodiment, the right-hand-drive and left-hand-drive installation grooves 34, 37 are arranged alternately in the circumferential direction. The first and second mounting groove portions 342, 343 of each of the right-hand-drive installation grooves 34 are arranged in a first order in the circumferential direction. The first and second mounting groove portions 372, 373 of each of the left-hand-drive installation grooves 37 are arranged in a second order opposite to the first order in which the first and second mounting groove portions 342, 343 of each of the right-hand-drive installation grooves 34 are arranged in the circumferential direction. Moreover, for each of the first groove-defining surfaces of the surrounding wall 32, the first arc surface portion has a radius of curvature greater than that of the second arc surface portion. For each of the second groove-defining surfaces of the surrounding wall 32, the first arc surface portion has a radius of curvature greater than that of the second arc surface portion. A circumferential distance between each one of the right-hand-drive and left-hand-drive installation grooves 34, 37 and an adjacent one of the right-hand-drive and left-hand-drive installation grooves 34, 37 that is proximate to the first mounting groove portion 342, 372 thereof is greater than that between the one of the right-hand-drive and left-hand-drive installation grooves 34, 37 and another adjacent one of the right-hand-drive and left-hand-drive installation grooves 34, 37 that is proximate to the second mounting groove portion 343, 373 thereof. As such, the wall thickness of the surrounding wall 32 between each one of the right-hand-drive and left-hand-drive installation grooves 34, 37 and the adjacent one of the right-hand-drive and left-hand-drive installation grooves 34, 37 that is proximate to the first mounting groove portion 342, 372 thereof is greater than the wall thickness between the one of the right-hand-drive and left-hand-drive installation grooves 34, 37 and the adjacent one of the right-hand-drive and left-hand-drive installation grooves 34, 37 that is proximate to the second mounting groove portion 343, 373 thereof.

Figure 7:
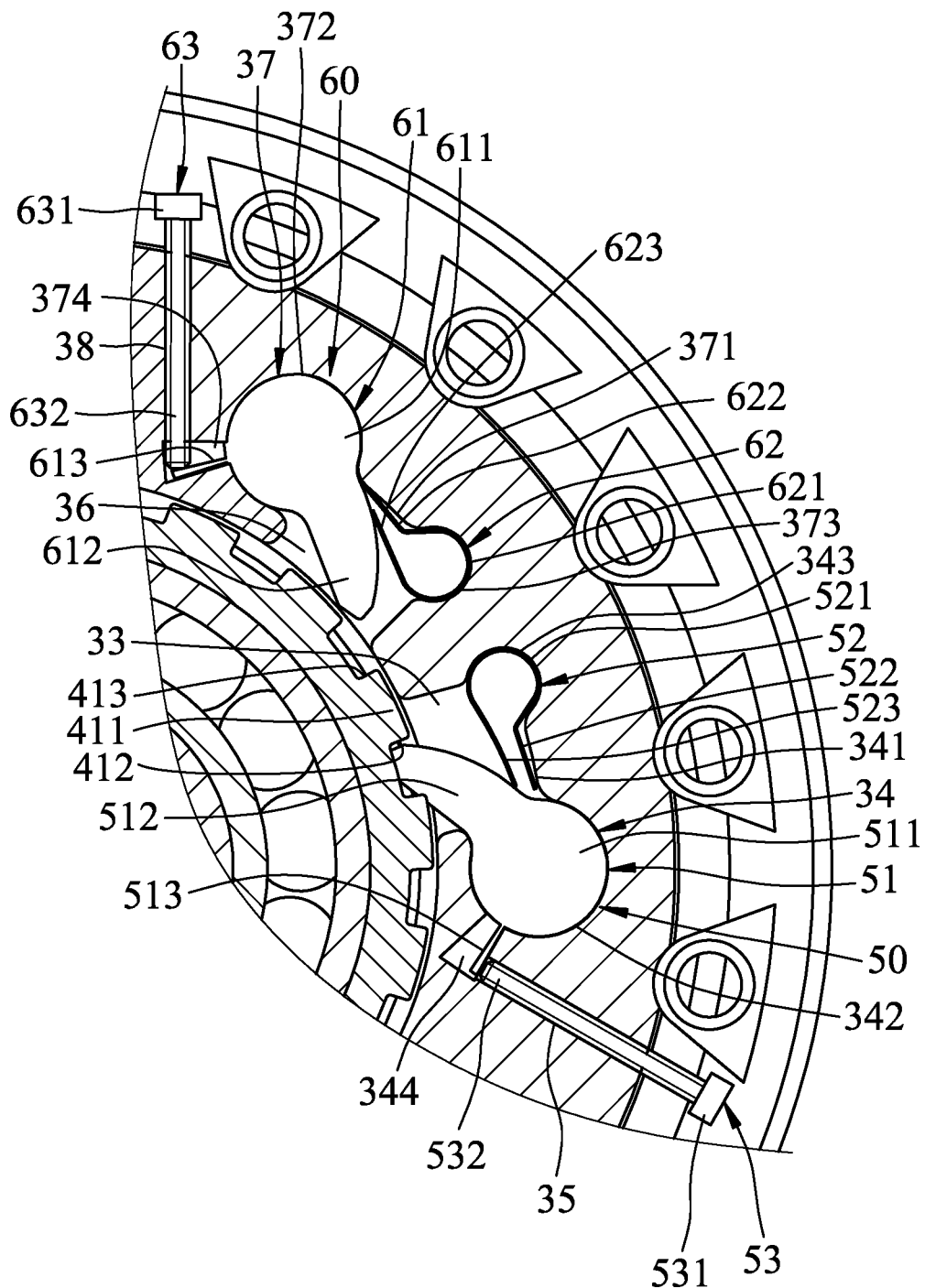
FIG. 7 is an enlarged fragmentary sectional view of a portion of FIG. 6.

Referring to FIGS. 5 to 7, The driving unit 40 is mounted on the bearings 22 of the axle unit 20, is rotatable about the axis (L), and has a ratchet ring section 41 that extends into the end section of the surrounding wall 32 and that has a plurality of outer teeth 411, and a sprocket section 42 that is disposed out of the hub shell 30 and that is formed integrally with the ratchet ring section 41. Each of the outer teeth 411 has first and second side surfaces 412, 413 that are opposite to each other in the circumferential direction of the ratchet ring section 41.

In this embodiment, the bidirectional hub assembly 2 includes three right-hand-drive units 50 that correspond respectively to the right-hand-drive installation grooves 34, and three left-hand-drive units 60 that correspond respectively to the left-hand-drive installation grooves 37. For the sake of brevity, only one right-hand-drive unit 50 and one left-hand-drive unit 60 will be described in the following paragraphs.

The right-hand-drive unit 50 includes a right-hand-drive pawl 51, a right-hand-drive resilient member 52 and a right-hand-drive switching member 53.

The right-hand-drive pawl 51 has a right mounting portion 511 mounted pivotally in the first mounting groove portion 342 of a respective one of the right-hand-drive installation grooves 34, a right claw portion 512 extending from the right mounting portion 511 into the opening 33 of the respective one of the right-hand-drive installation grooves 34, and a right driven portion 513 extending from the right mounting portion 511 and into the limiting groove portion 344 of the respective one of the right-hand-drive installation grooves 34.

The right-hand-drive resilient member 52 has a mounting section 521 that is mounted in the second mounting groove portion 343 of the respective one of the right-hand-drive installation grooves 34, a positioning section 522 that extends from the mounting section 521 and that abuts against the bottom surface portion 341 of the corresponding one of the first groove-defining surfaces, and an urging section 523 that extends from the mounting section 521 and that abuts against the right-hand-drive pawl 51 for biasing resiliently the right claw portion 512 of the right-hand-drive pawl 51 toward the ratchet ring section 41 of the driving unit 40.

Figure 8:
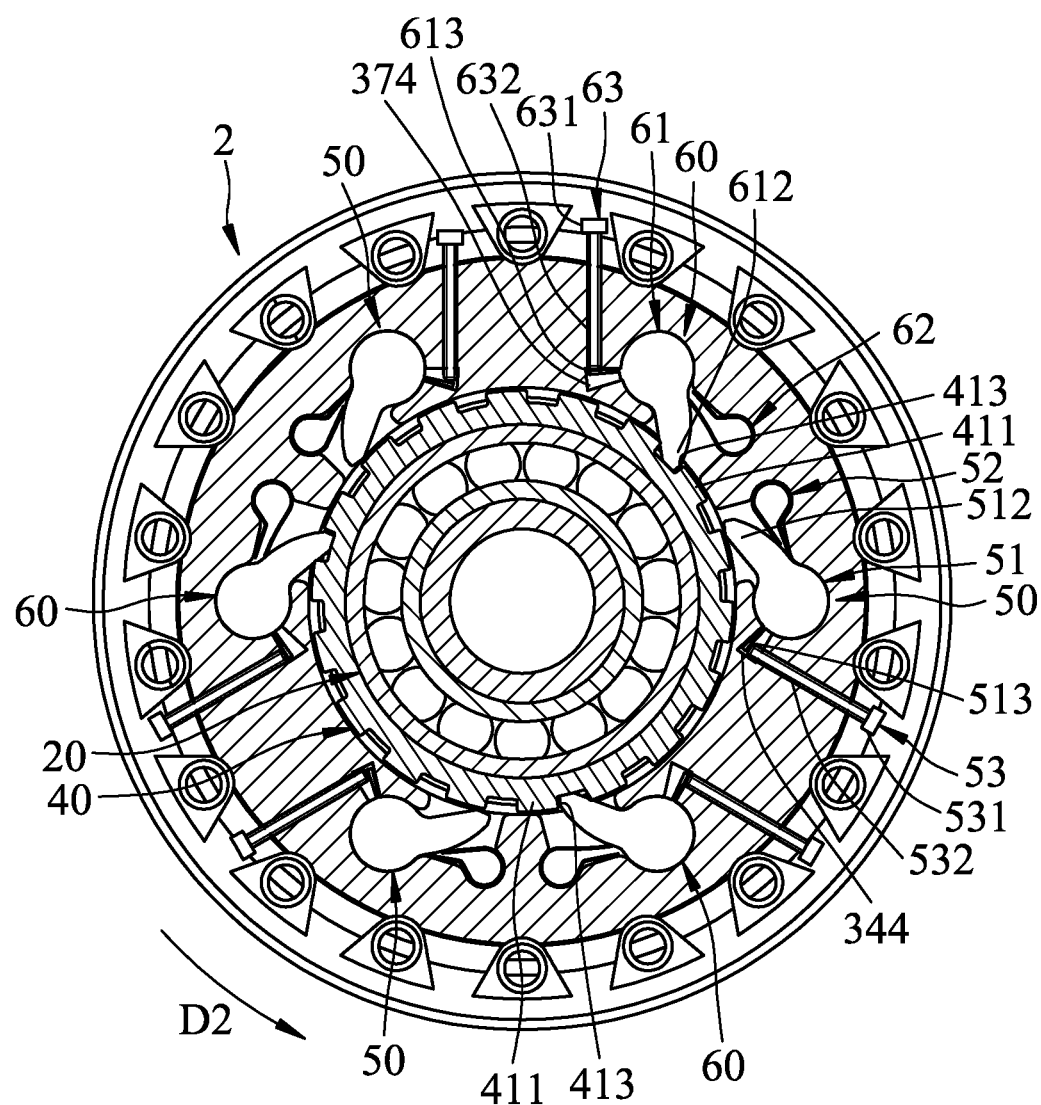
FIG. 8 is another sectional view similar to FIG. 5, but illustrating the embodiment serving as a left-hand-drive hub.

The right-hand-drive switching member 53 is mounted movably in the hub shell 30, and has an operation portion 531 extending out of the surrounding wall 32, and a driving portion 532 in contact with the right driven portion 513 of the right-hand-drive pawl 51 for switching the right-hand-drive pawl 51 between an enabled state (see FIGS. 6 and 7) where the right-hand-drive resilient member 52 urges the right-hand-drive pawl 51 to bias resiliently the right claw portion 512 to contact the ratchet ring section 41 such that the right claw portion 512 is engageable with the first side surface 412 of one of the outer teeth 411, and a disabled state (see FIG. 8) where the right-hand-drive switching member 53 pushes the right driven portion 513 of the right-hand-drive pawl 51 to separate the right claw portion 512 from any one of the first side surfaces 412 of the outer teeth 411 of the ratchet ring section 41 against the biasing action of the right-hand-drive resilient member 52.

In this embodiment, each of the right-hand-drive through holes 35 is configured as a threaded hole. The right driven portion 513 of the right-hand-drive pawl 51 is configured as a protruding block. The right-hand-drive switching member 53 has a threaded rod portion that engages threadably a respective one of the right-hand-drive through holes 35. The length of a portion of the threaded rod portion of the right-hand-drive switching member 53 disposed in the limiting groove portion 344 of the respective one of the right-hand-drive installation grooves 34 is adjustable by rotating the operation portion 531 of the right-hand-drive switching member 53, so that the driving portion 532 in contact with the right driven portion 513 of the right-hand-drive pawl 51 rotates the right claw portion 512 of the right-hand-drive pawl 51. In a variation of the embodiment, each of the right-hand-drive through holes 35 may be configured as an unthreaded through hole, and the right-hand-drive switching member 53 may be configured as a pin that is inserted movably into the respective one of the right-hand-drive through holes 35 for switching the state of the right-hand-drive pawl 51.

The left-hand-drive unit 60 includes a left-hand-drive pawl 61, a left-hand-drive resilient member 62 and a left-hand-drive switching member 63.

The left-hand-drive pawl 61 has a left mounting portion 611 mounted pivotally in the first mounting groove portion 372 of a respective one of the left-hand-drive installation grooves 37, a left claw portion 612 extending from the left mounting portion 611 into the opening 36 of the respective one of the left-hand-drive installation grooves 37, and a left driven portion 613 extending from the left mounting portion 611 and into the limiting groove portion 374 of the respective one of the left-hand-drive installation grooves 37.

The left-hand-drive resilient member 62 has a mounting section 621 that is mounted in the second mounting groove portion 373 of the respective one of the left-hand-drive installation grooves 37, a positioning section 622 that extends from the mounting section 621 and that abuts against the bottom surface portion 371 of the corresponding one of the second groove-defining surfaces, and an urging section 623 that extends from the mounting section 621 and that abuts against the left-hand-drive pawl 61 for biasing resiliently the left claw portion 612 of the right-hand-drive pawl 61 toward the ratchet ring section 41 of the driving unit 40.

The left-hand-drive switching member 63 is mounted movably in the hub shell 30, and has an operation portion 631 extending out of the surrounding wall 32, and a driving portion 632 in contact with the left driven portion 613 of the left-hand-drive pawl 61 for switching the left-hand-drive pawl 61 between an enabled state (see FIG. 8) where the left-hand-drive resilient member 62 urges the left-hand-drive pawl 51 to bias resiliently the left claw portion 612 to contact the ratchet ring section 41 such that the left claw portion 612 is engageable with the second side surface 413 of one of the outer teeth 411, and a disabled state (see FIGS. 6 and 7) where the left-hand-drive switching member 63 pushes the left driven portion 613 of the left-hand-drive pawl 61 to separate the left claw portion 612 from any one of the second side surfaces 413 of the outer teeth 411 of the ratchet ring section 41 against the biasing action of the left-hand-drive resilient member 62.

In this embodiment, each of the left-hand-drive through holes 38 is configured as a threaded hole. The left driven portion 613 of the left-hand-drive pawl 61 is configured as a protruding block. The left-hand-drive switching member 63 has a threaded rod portion that engages threadably a respective one of the left-hand-drive through holes 38. The length of a portion of the threaded rod portion of the left-hand-drive switching member 63 disposed in the limiting groove portion 374 of the respective one of the left-hand-drive installation grooves 37 is adjustable by rotating the operation portion 631 of the left-hand-drive switching member 63, so that the driving portion 632 in contact with the left driven portion 613 of the left-hand-drive pawl 61 rotates the left claw portion 612 of the left-hand-drive pawl 61. In a variation of the embodiment, each of the left-hand-drive through holes 38 may be configured as an unthreaded through hole, and the left-hand-drive switching member 63 may be configured as a pin that is inserted movably into the respective one of the left-hand-drive through holes 38.

When the bidirectional hub assembly 2 of this disclosure serves as a right-hand-drive hub (i.e., the sprocket section 42 of the driving unit 40 is located at the right hand side of a bicycle), the operation portion 531 of the right-hand-drive switching member 53 of each of the right-hand-drive units 50 is rotated to decrease the length of the portion of the right-hand-drive switching member 53 in the limiting groove portion 344 of the respective one of the right-hand-drive installation grooves 34, so as to switch the right-hand-drive pawl 51 of the corresponding right-hand-drive unit 50 to the enabled state, and the operation portion 631 of the left-hand-drive switching member 63 of each of the left-hand-drive units 60 is rotated to increase the length of the portion of the left-hand-drive switching member 63 in the limiting groove portion 374 of the respective one of the left-hand-drive installation grooves 37, so as to switch the left-hand-drive pawl 61 of the corresponding left-hand-drive unit 60 to the disabled state. As such, when the driving unit 40 rotates in a first rotational direction (D1) (see FIG. 6), the hub shell 30 is driven to co-rotate with the driving unit 40 through the engagement between the ratchet ring section 41 and the right-hand-drive units 50. When the driving unit 40 rotates in a rotational direction opposite to the first rotational direction (D1), the outer teeth 411 of the ratchet ring section 41 push the right-hand-drive pawl 51 of each of the right-hand-drive units 50 to be disengaged from the corresponding first side surface 412 (see FIG. 7), resulting in idle rotation of the driving unit 40.

When the bidirectional hub assembly 2 of this disclosure serves as a left-hand-drive hub (i.e., the sprocket section 42 of the driving unit 40 is located at the left hand side of a bicycle), the operation portion 531 of the right-hand-drive switching member 53 of each of the right-hand-drive units 50 is rotated to increase the length of the portion of the right-hand-drive switching member 53 in the limiting groove portion 344 of the respective one of the right-hand-drive installation grooves 34, so as to switch the right-hand-drive pawl 51 of the corresponding right-hand-drive unit 50 to the disabled state, and the operation portion 631 of the left-hand-drive switching member 63 of each of the left-hand-drive units 60 is rotated to decrease the length of the portion of the left-hand-drive switching member 63 in the limiting groove portion 374 of the respective one of the left-hand-drive installation grooves 37, so as to switch the left-hand-drive pawl 61 of the corresponding left-hand-drive unit 60 to the enabled state. As such, when the driving unit 40 rotates in a second rotational direction (D2) (see FIG. 8), the hub shell 30 is driven to co-rotate with the driving unit 40 through the engagement between the ratchet ring section 41 and the left-hand-drive units 60. When the driving unit 40 rotates in a rotational direction opposite to the second rotational direction (D2), the outer teeth 411 of the ratchet ring section 41 push the left-hand-drive pawl of each of the left-hand-drive units 60 to be disengaged from the corresponding second side surface 413, resulting in idle rotation of the driving unit 40.

To sum up, the bidirectional hub assembly 2 of this disclosure has the following advantages:

1. The bidirectional hub assembly 2 is converted between a right-hand-drive hub and a left-hand-drive hub through simple operation of the right-hand-drive switching members 53 and the left-hand-drive switching members 63 without uninstalling any component thereof.

Figure 1:
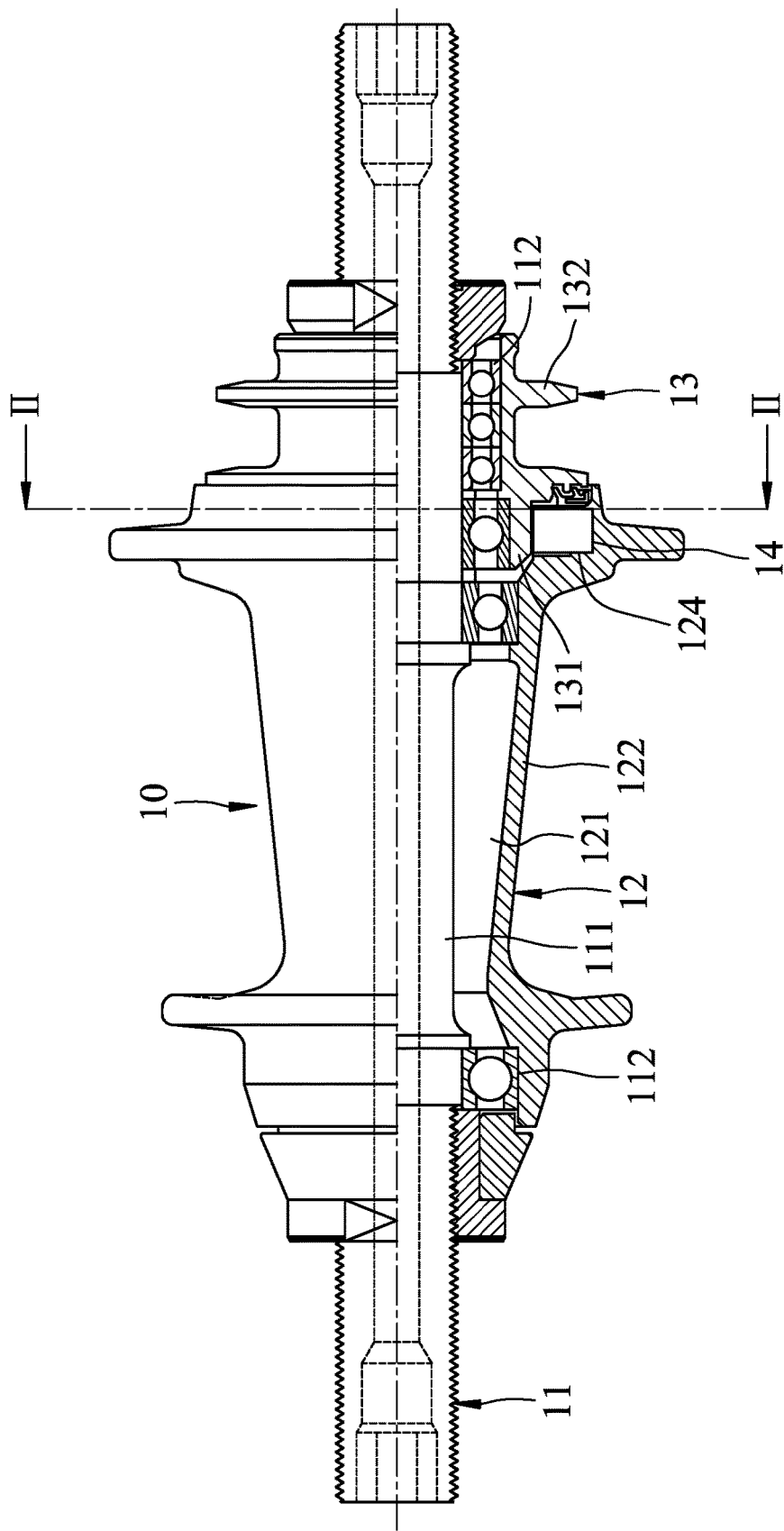
FIG. 1 is a partly sectional view of a conventional hub assembly serving as a right-hand-drive hub.
Figure 2:
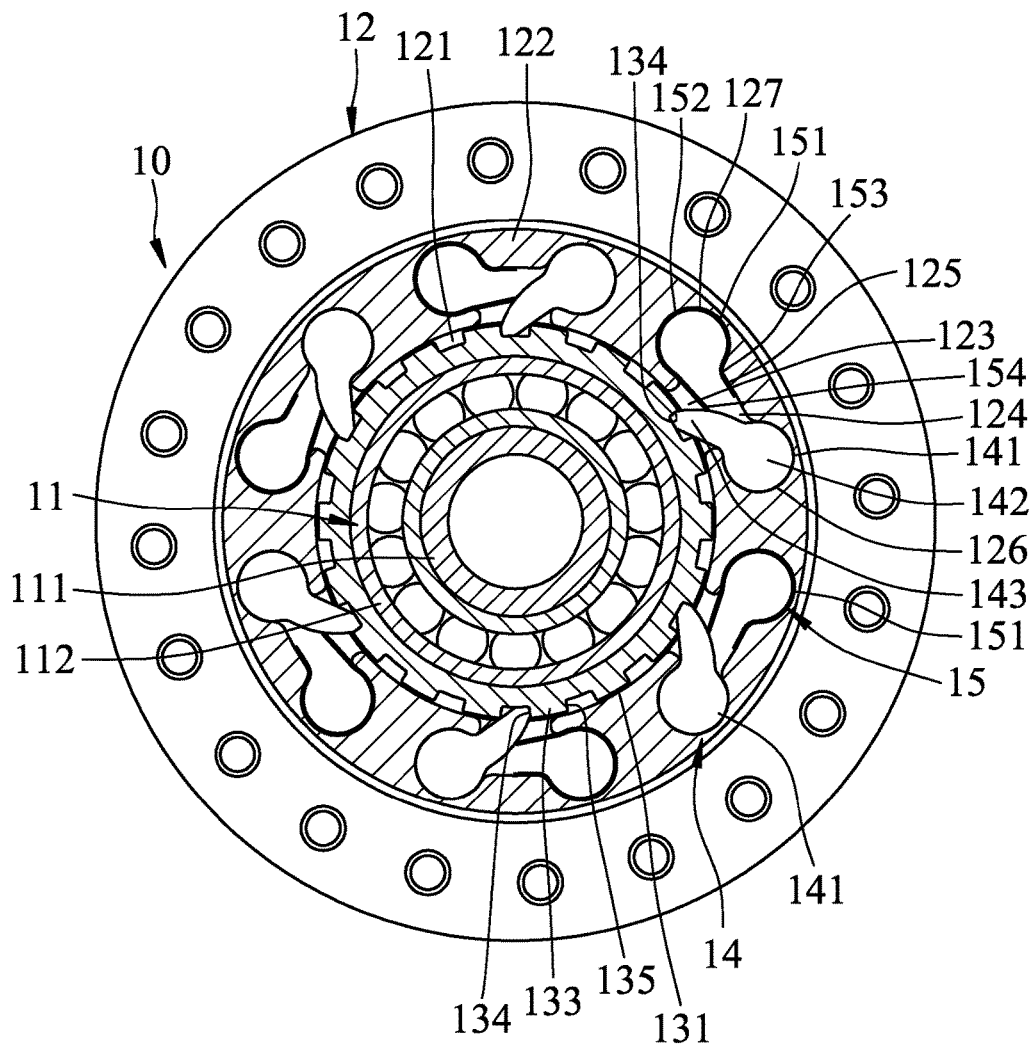
FIG. 2 is a sectional view of the conventional hub assembly taken along line II-II in FIG. 1.
Figure 3:
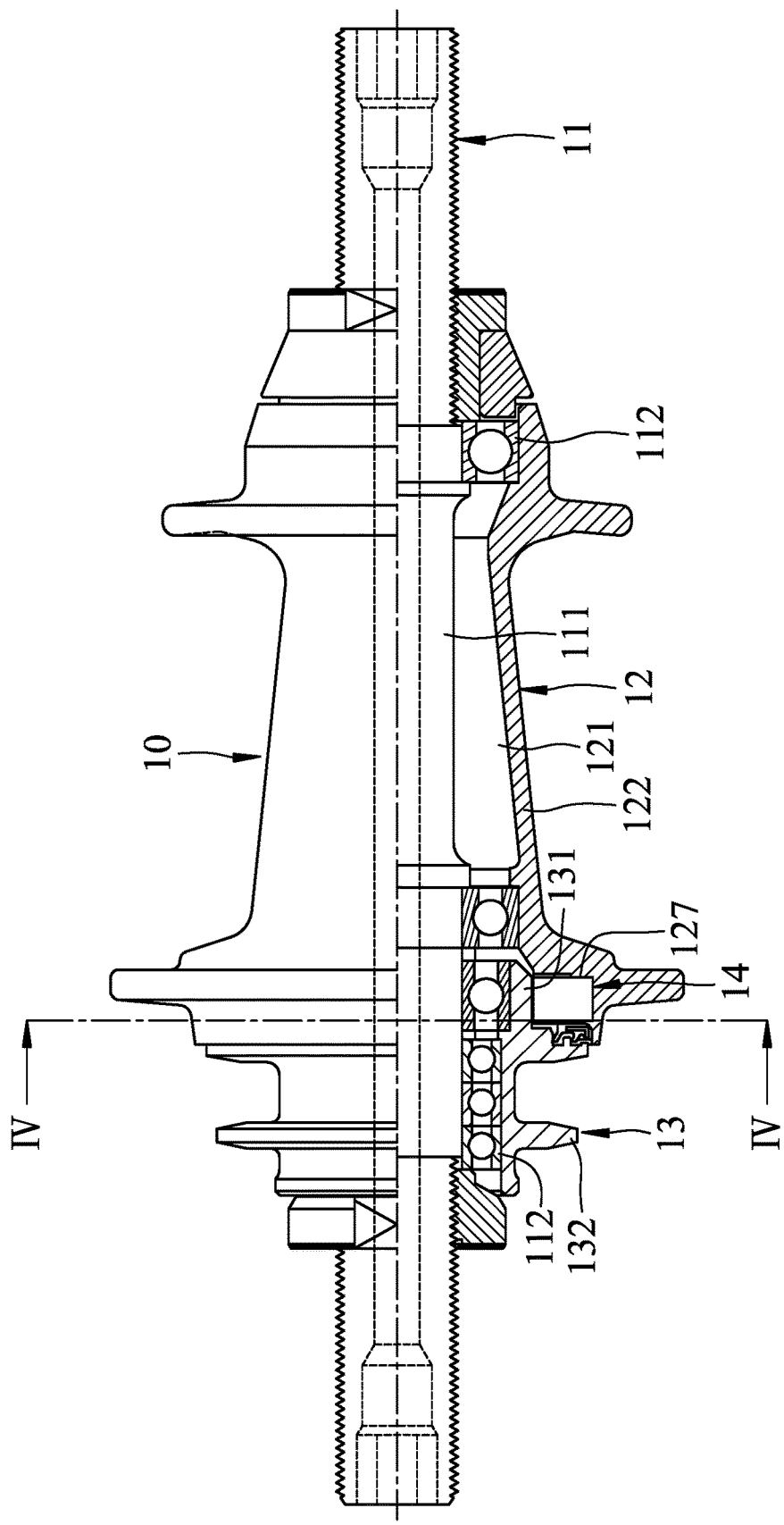
FIG. 3 is another partly sectional view of the conventional hub assembly serving as a left-hand-drive hub.
Figure 4:
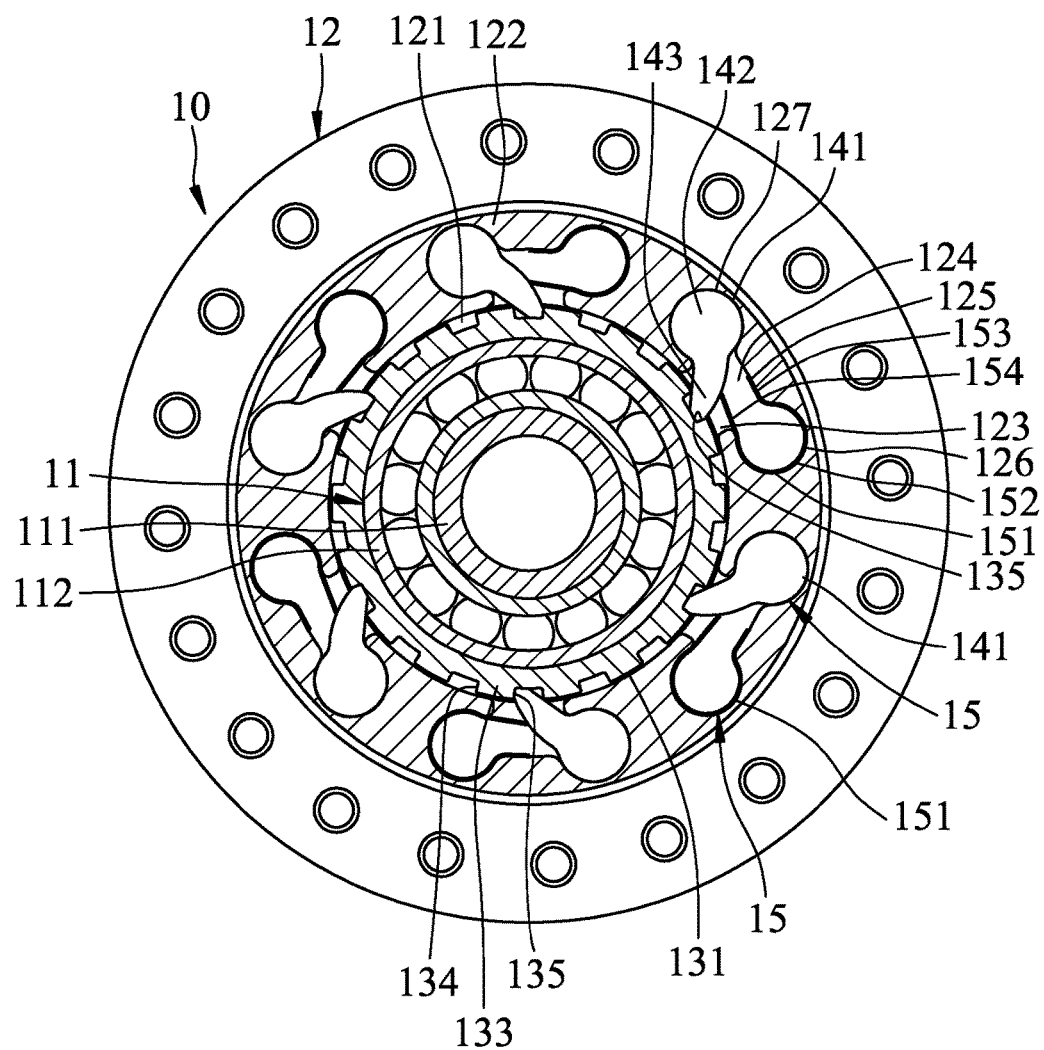
FIG. 4 is another sectional view of the conventional hub assembly taken along line IV-IV in FIG. 3.

2. Since the first arc surface portion of each of the first groove-defining surfaces has a radius of curvature greater than that of the second arc surface portion of the corresponding first groove-defining surface, and the first arc surface portion of each of the second groove-defining surfaces has a radius of curvature greater than that of the second arc surface portion of the corresponding second groove-defining surface, the hub shell 30 of the bidirectional hub assembly 2 of this disclosure has less voids compared with the hub shell 12 of the conventional hub assembly 10 in the prior art (see FIG. 2).

3. Since the wall thickness of the surrounding wall between each one of the right-hand-drive and left-hand-drive installation grooves 34, 37 and the adjacent one of the right-hand-drive and left-hand-drive installation grooves 34, 37 that is proximate to the first mounting groove portion 342, 372 thereof is greater than the wall thickness between the one of the right-hand-drive and left-hand-drive installation grooves 34, 37 and the adjacent one of the right-hand-drive and left-hand-drive installation grooves 34, 37 that is proximate to the second mounting groove portion 343, 373 thereof, the portions of the surrounding wall 32 of the hub shell 30 for supporting the right-hand-drive pawls 51 and the left-hand-drive pawls 61 have better structural strengths.

4. The bidirectional hub assembly 2 of this disclosure has a relatively simple structure compared with the conventional hub assembly of U.S. Pat. No. 4,766,772.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A bidirectional hub assembly comprising:

an axle unit extending along an axis;

a hub shell mounted on said axle unit, rotatable about the axis, and having a surrounding wall, a plurality of right-hand-drive installation grooves and a plurality of left-hand-drive installation grooves, said surrounding wall defining an inner space therein, said right-hand-drive and left-hand-drive installation grooves being formed in an inner surrounding surface of an end section of said surrounding wall, each of said right-hand-drive installation grooves being defined by a respective one of first groove-defining surfaces of said surrounding wall, and having an opening that communicates spatially with said inner space, each of said first groove-defining surfaces having a bottom surface portion that faces said opening of the corresponding one of said right-hand-drive installation grooves, and a first arc surface portion that is connected to one end of said bottom surface portion in the circumferential direction of said surrounding wall and that defines a first mounting groove portion of the corresponding one of said right-hand-drive installation grooves, each of said left-hand-drive installation grooves being defined by a respective one of second groove-defining surfaces of said surrounding wall, and having an opening that communicates spatially with said inner space, each of said second groove-defining surfaces having a bottom surface portion that faces said opening of the corresponding one of said left-hand-drive installation grooves, and a first arc surface portion that is connected to one end of said bottom surface portion in the circumferential direction of said surrounding wall and that defines a first mounting groove portion of the corresponding one of said left-hand-drive installation grooves;

a driving unit mounted on said axle unit, rotatable about the axis, and having a ratchet ring section that extends into said end section of said surrounding wall and that has a plurality of outer teeth, each of said outer teeth having first and second side surfaces that are opposite to each other in the circumferential direction of said ratchet ring section;

a plurality of right-hand-drive units each including a right-hand-drive pawl that has a mounting portion mounted pivotally in said first mounting groove portion of a respective one of said right-hand-drive installation grooves, a claw portion extending from said mounting portion into said opening of the respective one of said right-hand-drive installation grooves, and a driven portion, a right-hand-drive resilient member that is mounted in the respective one of said right-hand-drive installation grooves for biasing resiliently said claw portion of said right-hand-drive pawl toward said ratchet ring section, and a right-hand-drive switching member that is mounted movably in said hub shell, and that has an operation portion extending out of said surrounding wall, and a driving portion in contact with said driven portion of said right-hand-drive pawl, said right-hand-drive pawl of each of said right-hand-drive units being operable to switch between an enabled state where said right-hand-drive resilient member urges said right-hand-drive pawl to bias resiliently said claw portion to contact said ratchet ring section such that said claw portion is engageable with said first side surface of one of said outer teeth, and a disabled state where said right-hand-drive switching member pushes said driven portion of said right-hand-drive pawl to separate said claw portion from any one of said first side surfaces of said outer teeth of said ratchet ring section against the biasing action of said right-hand-drive resilient member; and a plurality of left-hand-drive units each including a left-hand-drive pawl that has a mounting portion mounted pivotally in said first mounting groove portion of a respective one of said left-hand-drive installation grooves, a claw portion extending from said mounting portion into said opening of the respective one of said left-hand-drive installation grooves, and a driven portion, a left-hand-drive resilient member that is mounted in the respective one of said left-hand-drive installation grooves for biasing resiliently said claw portion of said left-hand-drive pawl toward said ratchet ring section, and a left-hand-drive switching member that is mounted movably in said hub shell, and that has an operation portion extending out of said surrounding wall, and a driving portion in contact with said driven portion of said left-hand-drive pawl, said left-hand-drive pawl of each of said left-hand-drive units being operable to switch between an enabled state where said left-hand-drive resilient member urges said left-hand-drive pawl to bias resiliently said claw portion to contact said ratchet ring section such that said claw portion is engageable with said second side surface of one of said outer teeth, and a disabled state where said left-hand-drive switching member pushes said driven portion of said left-hand-drive pawl to separate said claw portion from any one of said second side surfaces of said outer teeth of said ratchet ring section against the biasing action of said left-hand-drive resilient member;

wherein, when said right-hand-drive pawl of at least one of said right-hand-drive units is in the enabled state and said left-hand-drive pawl of each of said left-hand-drive units is in the disabled state, said bidirectional hub assembly serves as a right-hand-drive hub; and wherein, when said right-hand-drive pawl of each of said right-hand-drive units is in the disabled state and said left-hand-drive pawl of at least one of said left-hand-drive units is in the enabled state, said bidirectional hub assembly serves as a left-hand-drive hub.

2. The bidirectional hub assembly as claimed in claim 1, wherein each of said right-hand-drive installation grooves further has a limiting groove portion that is formed in said first arc surface portion of the corresponding one of said first groove-defining surfaces, said hub shell further having a plurality of right-hand-drive through holes each of which is formed in an outer surface of said hub shell and communicates spatially with said limiting groove portion of a respective one of said right-hand-drive installation grooves, said driven portion of said right-hand-drive pawl of each of said right-hand drive units extending into said limiting groove portion of the respective one of said right-hand-drive installation grooves, said right-hand-drive switching member of each of said right-hand-drive units engaging threadably a respective one of said right-hand-drive through holes and being in contact with said driven portion of said right-hand-drive pawl of said right-hand-drive unit, each of said left-hand-drive installation grooves further having a limiting groove portion that is formed in said first arc surface portion of the corresponding one of said second groove-defining surfaces, said hub shell further having a plurality of left-hand-drive through holes each of which is formed in said outer surface of said hub shell and communicates spatially with said limiting groove portion of a respective one of said left-hand-drive installation grooves, said driven portion of said left-hand-drive pawl of each of said left-hand-drive units extending into said limiting groove portion of the respective one of said left-hand-drive installation grooves, said left-hand-drive switching member of each of said left-hand-drive units engaging threadably a respective one of said left-hand-drive through holes and being in contact with said driven portion of said left-hand-drive pawl of said left-hand-drive unit.

3. The bidirectional hub assembly as claimed in claim 1, wherein each of said first groove-defining surfaces further has a second arc surface portion that is connected to an end of said bottom surface portion distal from said first arc surface portion and that defines a second mounting groove portion of the corresponding one of said right-hand-drive installation grooves, said right-hand-drive resilient member of each of said right-hand-drive units having a mounting section that is mounted in said second mounting groove portion of the respective one of said right-hand-drive installation grooves, a positioning section that extends from said mounting section and that abuts against said bottom surface portion of the corresponding one of said first groove-defining surfaces, and an urging section that extends from said mounting section and that abuts against said right-hand-drive pawl of said right-hand-drive unit, each of said second groove-defining surfaces further having a second arc surface portion that is connected to an end of said bottom surface portion distal from said first arc surface portion and that defines a second mounting groove portion of the corresponding one of said left-hand-drive installation grooves, said left-hand-drive resilient member of each of said left-hand-drive units having a mounting section that is mounted in said second mounting groove portion of the respective one of said left-hand-drive installation grooves, a positioning section that extends from said mounting section and that abuts against said bottom surface portion of the corresponding one of said second groove-defining surfaces, and an urging section that extends from said mounting section and that abuts against said left-hand-drive pawl of said left-hand-drive unit.

4. The bidirectional hub assembly as claimed in claim 3, wherein:

for each of said first groove-defining surfaces, said first arc surface portion has a radius of curvature greater than that of said second arc surface portion; and for each of said second groove-defining surfaces, said first arc surface portion has a radius of curvature greater than that of said second arc surface portion.

5. The bidirectional hub assembly as claimed in claim 4, wherein said right-hand-drive and left-hand-drive installation grooves are arranged alternately in the circumferential direction, said first and second mounting groove portions of each of said right-hand-drive installation grooves being arranged in a first order in the circumferential direction, said first and second mounting groove portions of each of said left-hand-drive installation grooves being arranged in a second order opposite to the first order in which said first and second mounting groove portions of each of said right-hand-drive installation grooves are arranged in the circumferential direction, a circumferential distance between each one of said right-hand-drive and left-hand-drive installation grooves and an adjacent one of said right-hand-drive and left-hand-drive installation grooves that is proximate to said first mounting groove portion thereof being greater than that between the one of said right-hand-drive and left-hand-drive installation grooves and another adjacent one of said right-hand-drive and left-hand-drive installation grooves that is proximate to said second mounting groove portion thereof.

6. The bidirectional hub assembly as claimed in claim 5, wherein said hub shell has three of said right-hand-drive installation grooves and three of said left-hand-drive installation grooves, said bidirectional hub assembly comprising three of said right-hand-drive units and three of said left-hand-drive units.

\* \* \* \* \*